United States Patent
Purnadi et al.

(10) Patent No.: US 7,346,340 B2
(45) Date of Patent: Mar. 18, 2008

(54) PROVISION OF USER POLICY TO TERMINAL

(75) Inventors: Rene Purnadi, Coppell, TX (US); Srinivas Sreemanthula, Flower Mound, TX (US); Haihong Zheng, Coppell, TX (US); Khiem Le, Coppell, TX (US)

(73) Assignee: Spyder Navigations L.L.C., Wilmington, DE (US)

( * ) Notice: Subject to any disclaimer, the term of this patent is extended or adjusted under 35 U.S.C. 154(b) by 330 days.

(21) Appl. No.: 11/170,100

(22) Filed: Jun. 30, 2005

(65) Prior Publication Data

US 2006/0141995 A1 Jun. 29, 2006

Related U.S. Application Data

(60) Provisional application No. 60/638,141, filed on Dec. 23, 2004.

(51) Int. Cl.
*H04Q 7/38* (2006.01)

(52) U.S. Cl. .............. 455/414.1; 455/426.2; 455/452.2; 455/456.3; 370/255; 370/331; 370/338; 370/352; 370/401; 370/466

(58) Field of Classification Search .............. 370/252, 370/395.3, 401, 466, 338, 468; 455/426.2, 455/466; 726/4, 5; 379/114.01
See application file for complete search history.

(56) References Cited

U.S. PATENT DOCUMENTS

| | | |
|---|---|---|
| 2002/0132611 A1 | 9/2002 | Immonen et al. |
| 2004/0072557 A1 | 4/2004 | Paila et al. |
| 2005/0041650 A1* | 2/2005 | O'Neill ................. 370/355 |
| 2005/0210285 A1* | 9/2005 | Williams ............... 713/201 |
| 2006/0008063 A1* | 1/2006 | Harnesk et al. ........ 379/114.01 |
| 2006/0030312 A1* | 2/2006 | Han et al. ............. 455/432.1 |
| 2006/0046746 A1* | 3/2006 | Ranford et al. ........ 455/456.5 |
| 2006/0276209 A1* | 12/2006 | Neves et al. ........... 455/466 |
| 2007/0089167 A1* | 4/2007 | Villavicencio ......... 726/5 |
| 2007/0121643 A1* | 5/2007 | Cunetto et al. ........ 370/395.3 |

* cited by examiner

*Primary Examiner*—Joseph Feild
*Assistant Examiner*—Inder Pal Mehra
(74) *Attorney, Agent, or Firm*—Foley & Lardner LLP

(57) ABSTRACT

There is disclosed a method for providing a user policy to a terminal connected in a network, the method comprising: configuring a user policy for the terminal; and authenticating the terminal, wherein the method further includes providing the configured user policy to the terminal responsive to successful authentication.

36 Claims, 3 Drawing Sheets

Operator A's policy for subscriber at home

| Subscription level \ Traffic Type | Conversation | Interactive |
|---|---|---|
| Gold | 1 | 2 |
| Silver | 1 | 3 |
| Bronze | 2 | 3 |

(a)

Operator B's policy for roaming users from operator A

| Subscription level \ Traffic Type | Conversation | Interactive |
|---|---|---|
| Gold | 1 | 3 |
| Silver | 2 | 3 |
| Bronze | 3 | 4 |

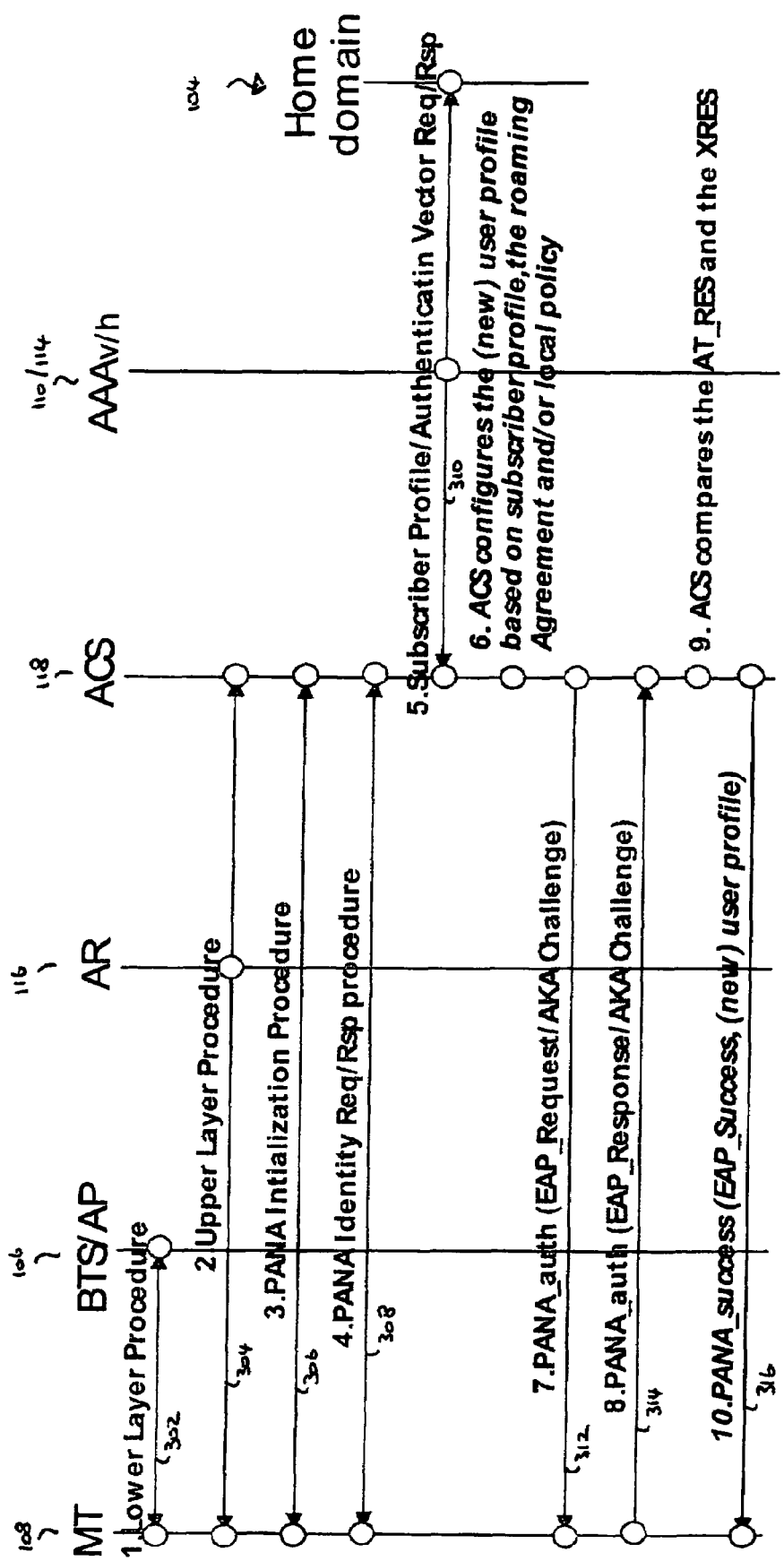

PROVISION OF USER POLICY TO TERMINAL

CROSS-REFERENCE TO RELATED APPLICATIONS:

This application claims priority of U.S. Provisional patent application Ser. No. 60/638,141, filed Dec. 23, 2004. The subject matter of this earlier application is hereby incorporated by reference herein in its entirety.

BACKGROUND TO THE INVENTION

1. Field of the Invention

The invention relates to the provision of a user policy to a terminal connected in a network. The invention particularly but not exclusively relates to the provision of a user policy to a terminal connected in a visited network.

2. Description of the Related Art

Mobile communication systems are an example of a network arrangement where a terminal, such as a mobile terminal, may move between, and connect into, different networks. In a mobile communication system, a mobile terminal will typically be associated with a particular network, known as its home network, and may roam throughout the system and connect into other networks, termed visited networks.

In a mobile communication system, a terminal is typically provided with a user policy. The user policy is some policy associated with the terminal, and is applied to traffic transmitted to or from the terminal. The policy may be, for example, a quality of service policy or a security policy.

The quality of service (QoS) to be applied to particular traffic may depend upon multiple parameters. One parameter is the user subscription level. For example, a user may be associated with one of two subscription levels, being labelled silver and gold. All other things being equal, the gold subscription level should result in a higher or equal QoS than a silver subscription level. Another parameter is the type of traffic, for example real-time, interactive, background etc.

The operator policy determines the mapping from a multi-dimensional tuple, such as subscription level or type of traffic, to a single dimensional value, for example, 1, 2, 3 etc., which defines the QoS level. The QoS level defines how a packet is treated, and marked, for example for the QoS purpose.

When a user is roaming in a mobile communication system, and is connected to a visited network, the policy applied is the one of the visited operator. That policy may be different from the policy of the home operator. Thus, the same type of traffic may be mapped to a different QoS level in the visited network compared to the level it will be mapped to in the home network. For downlink traffic, the visited network may apply the local policy of the visited network to determine a QoS level, and treat the traffic according to that QoS level.

It is an aim of the invention to provide for an appropriate handling of uplink traffic in accordance with an appropriate user policy.

SUMMARY OF THE INVENTION

There is provided a method for providing a user policy to a terminal connected in a network, the method comprising: configuring a user policy for the terminal; and authenticating the terminal, wherein the method further includes providing the configured user policy to the terminal responsive to successful authentication.

There is provided a mobile communication system including a terminal for connection in a network, the system including a network element for configuring a user policy for the terminal, the system further being adapted to authenticate the terminal, wherein responsive to successful authentication the network element is adapted to provide the configured user policy to the terminal.

There is provided a user terminal for connection in a network of a mobile communication system, the user terminal being adapted to receive a configured user policy at an input thereof, and to implement said configured user policy.

There is provided a network element for a mobile communication system having at least one user terminal for connection in a network, the network element being adapted to configure a user policy for the terminal, to authenticate the terminal, and responsive to successful authentication to provide the configured user policy to the terminal.

The invention and embodiments thereof provides a method for providing a user policy to a terminal. The invention preferably relates to the provision of such a technique when a terminal is connected in a visited network.

The user policy may be a Quality of Service (QoS) policy or a security policy, in accordance to the visited network policy for example.

Preferably the policy is based on at least one of a user subscription policy, a roaming agreement between the visited and home network operators, and the local policy of the visited network. This may apply even when the visited and home networks belong to the same operator. The user subscriber policy is preferably the subscriber policy of the terminal's home network.

Preferably the terminal applies the policy to all uplink packets from the terminal.

The invention thus ensures that the user policy in the visited network is synchronised.

The method preferably includes, responsive to detection of the terminal in the visited network, the step of obtaining the subscriber policy from the home network. The subscriber policy is preferably pulled from the home network by the visited network. The subscriber policy is preferably obtained from the home network during an authentication procedure for the terminal.

The provided user policy may be delivered to the terminal during the authentication procedure. The provided user policy may be piggy-backed in an authentication message to the terminal.

The provided user policy may be delivered in a specific message.

The provided user policy is preferably enforced following successful authentication.

The authentication procedure may be provided by a protocol for carrying authentication for network access, for example PANA, procedure. The authentication scheme is preferably an authentication and key agreement scheme. The PANA procedure may also preferably provide for registration of the terminal in the visited network.

The configuration of the user profile for the terminal in the visited network is preferably by an access network control server, ACS. The user profile is preferably delivered to the terminal by the ACS following successful authentication. The user profile is preferably provided to the terminal in a PANA_Success message.

BRIEF DESCRIPTION OF THE FIGURES

The invention is now described by way of example with reference to the accompanying Figures in which:

FIGS. 2(a) and 2(b) illustrate the user policy in the different networks of FIG. 1; and FIG. 3 illustrates the registration and authentication procedure of a terminal where the user profile is further delivered to the terminal in accordance with a preferred embodiment of the invention.

DESCRIPTION OF THE PREFERRED EMBODIMENTS

Figure 1:
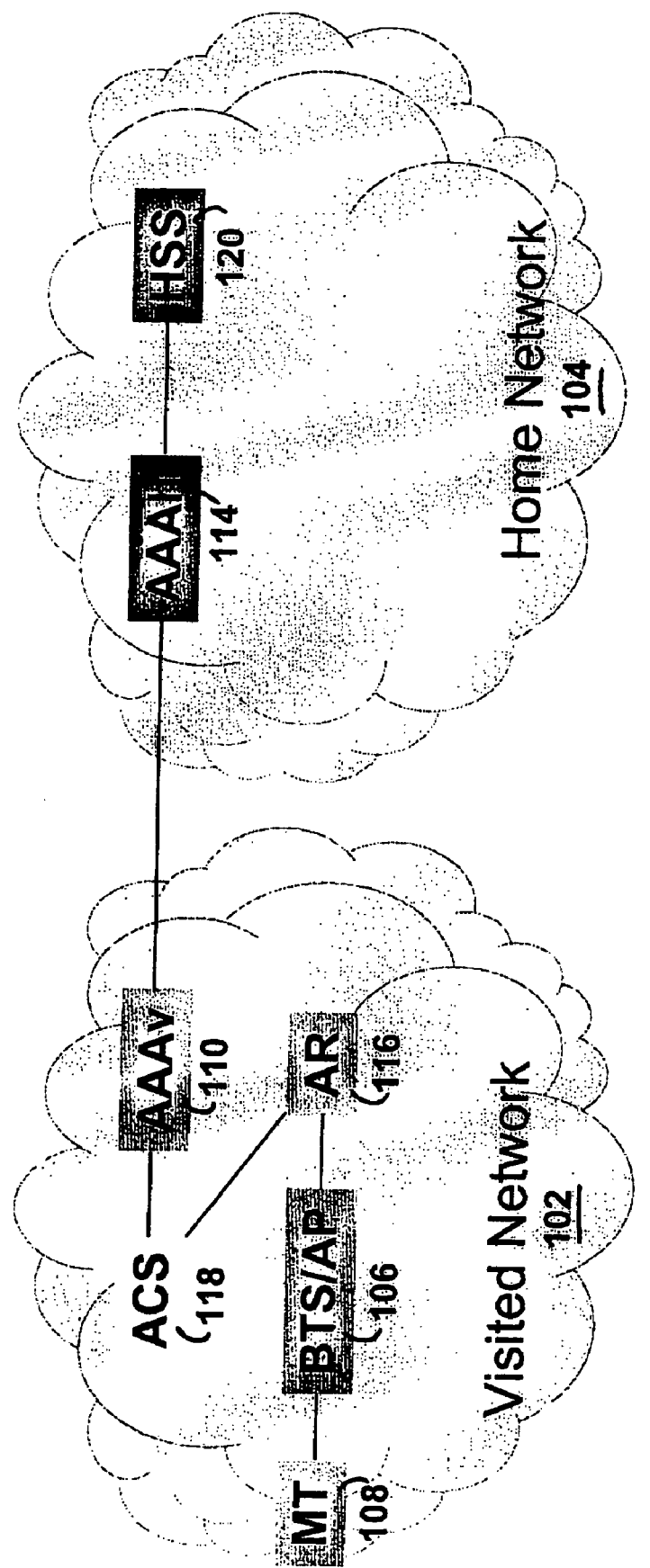
FIG. 1 illustrates an arrangement of a home network and a visited network, in which example scenario the invention may be advantageously applied.

The invention is described herein by way of reference to a particular embodiment. It should be understood that the invention is not limited to the specific aspects of the described embodiment. In particular, the invention is described herein in relation to a mobile terminal roaming in a mobile communications system between networks.

Referring to FIG. 1, there is illustrated an exemplary mobile communication system including two networks, a network 104 denoted a home network and a network 102 denoted a visited network. As shown in FIG. 1, a mobile terminal 108 is currently located in the visited network 102. The home network 104 is the normal network with which the mobile terminal 108 is usually associated. The principles of roaming of mobile terminals across networks in a mobile communication system is well-known in the art.

With further reference to FIG. 1, those elements of the communication system necessary for understanding an implementation of the present invention are further illustrated. Referring to the visited network 102, there is illustrated a base transceiver station (BTS) or access point (AP) 106, which provides a connection into the visited network 102 for the mobile terminal 108. The visited network 102 additionally includes a visited network authentication, authorisation, and accounting server (AAAv) 110; an access router (AR) 116 and an access network control server (ACS) 118.

In this illustration, the home network includes a home network AAA server, AAAh, 114, and Home Subscriber Server, HSS, 120.

The access network control server 118 and the access router 116 provide access to the visited network in the mobile communication system as is well-known in the art. As is illustrated in FIG. 1, in the visited network the AAAV 110 is connected to the ACS 118, the ACS 118 is connected to the AR 116, and the AR 116 is in turn connected to the BTS/APs 106. In the home network the AAAH 114 is connected to the HSS 120. The AAAV 110 is connected to the AAAH 114. The interconnection of the various elements of the mobile communication system illustrated in FIG. 1 is not described in detail any further herein, as such interconnection and the operation of such interconnections will be well-known to one skilled in the art.

Referring to FIGS. 2a and 2b, there is illustrated examples of quality of service (QoS) level policies maintained by the operators associated with each of the home network 104 and the visited network 102.

FIG. 2a illustrates the policy for a subscriber whose home network is the home network 104, which is assumed to be under the control of an operator A. FIG. 2b illustrates the policy for roaming users having a home network of the home network 104, which are roaming in the visited network 102. The visited network 102 is illustrated to be under the control of an operator B. When a subscriber from the operator A domain, i.e. the home network 104, is roaming in the serving network that belongs to the domain of the operator B, i.e. the visited network 102, that subscriber will follow the policy of operator B for roaming users from operator A.

For example, when a gold level subscriber from the home network 104, running a conversational application, is roaming in the visited network 102, the subscriber is assigned a QoS level of 1, which is the same QoS level when the subscriber is connected in its own home network. However, when a silver level subscriber whose home network is the home network 104, also running a conversational application, is roaming in the visited network 102, the subscriber is assigned a QoS level 2, which is different from the QoS level 1 it would ordinarily be assigned in its home network.

As another example, it can be seen that when a gold level subscriber associated with the home network 104 is running an interactive application, and is roaming in the visited network 102, the subscriber is assigned a QoS level 3 which is different than a QoS level 2 it would normally be assigned in its own home network 104. However when a silver level subscriber whose home network is the home network 104, also running an interactive application, is roaming in the visited network 102, the subscriber is assigned a QoS level 3, which is the same QoS level the subscriber would be allocated if connected in its home network 104.

For each traffic type, the QoS level is determined by a subscriber profile, a local policy in the visited network and the roaming agreement between the operators.

The operation of the invention is now described in further detail with reference to the signalling chart of FIG. 3. Referring to FIG. 3, the signalling that takes place when the mobile terminal 108 roams into the visited network 102 is illustrated.

As denoted by signalling 302 in FIG. 3, an initial lower layer procedure takes place between the mobile terminal 108 and the BTS/AP 106. Following the lower layer procedure, an upper layer procedure, denoted by signalling 304, takes place between the mobile terminal 108 and the access router 116 and the access network control server 118.

After the initial lower layer and upper layer procedures, registration takes place. For the purposes of the described embodiment, it is assumed that a protocol for carrying authentication for network access, PANA, procedure is used for registration and authentication.

As denoted by signalling 306, a PANA initialisation procedure takes place between the mobile terminal 108 and the access network control server 118.

Thereafter, as denoted by signalling 308, a PANA identity request/response procedure takes place between the mobile terminal 108 and the access network control server 118.

Following these procedures, the access network control server authenticates the mobile terminal by locating the home network of the mobile terminal and communicating with such home network. Thus, as denoted by a signalling 310, a subscriber profile/authentication vector request/response takes place between the access network control server 118 and the Home Subscriber Server 120 (represented by the "home domain" in FIG. 3), through the AAA servers 110 and 114 of the visited network 102 and home networks 104.

Thereafter the access network control server 118 configures a user profile or user policy for the mobile terminal 108. This user profile may be based on the subscriber profile for the mobile terminal obtained from the home network, the roaming agreement between the visited network and the home network, and/or the local policy of the visited network.

In a preferred embodiment, the roaming agreement between the home network operator and the visited network operator governs the user policy. In a simple example, the user policy may be determined by the lowest level of each of the subscriber profile in the home network and the roaming agreement between the visited and home networks. With further reference to FIG. 2, a silver level subscriber has a a priority 1 for conversational traffic in the home network, but the roaming agreement provides for a priority of 2. In such case the priority of 2 may be applied as the user profile, being the least value priority amongst all values, and a priority which therefore complies with both the subscriber policy and the roaming policy.

It will be understood that the attributes determining the user policy may be more than just a priority value. Other attributes may be, for example, the maximum bandwidth or the maximum delay.

The policy in the visited network may be taken into account, for example, if the local policy does not support data encryption, then the new user policy should take that into account, even though the home network of the subscriber may require encryption.

In summary, therefore, the user policy is preferably determined in dependence on the lowest common denominator, for any particular attribute, between all policies taken into account. The lowest common denominator will result in a value for any attribute being chosen which does not conflict with the value limit or range of any policy. Thus, for example, where the attribute is maximum bandwidth, where two different policies identify two different values, the lowest of such values is chosen.

As discussed above, the policies taken into account for each attribute may include the subscriber policy in the home network, the roaming agreement between the home network and the visited network, and the local policy of the visited network.

The attributes themselves may include a priority value, a maximum bandwidth value, or a maximum delay value for example.

The PANA procedure is then continued by the transmission of a PANA authorisation message, as denoted by signalling 312, from the access network control server 118 to the mobile terminal 102. The PANA authorisation signalling 312 includes an extensible authentication protocol (EAP) request/authentication and key agreement (AKA) challenge. Thereafter the access network control server 118 receives a PANA authorisation response, as denoted by signalling 314, from the mobile terminal 108. The PANA authorisation signalling 314 includes an $EAP_{13}$ Response/AKA Challenge. The access network control server 118 then compares the challenge response ($AT_{13}$ RES) and the expected result (XRES). Based on such comparison, authentication is established.

Following successful authentication, the access network control server 118 transmits a PANA success message, as denoted by signalling 316, to the mobile terminal 108. The PANA success message includes an EAP_Success field. In accordance with the invention, the PANA success message also includes a user profile, specifically a new user profile for the mobile terminal 108.

It should be noted that the PANA procedure described hereinabove is known in the art, and is not described in detail for this reason. The invention is not limited in its applicability to scenarios where the PANA procedure is used, nor to scenarios where AKA authentication is used.

Thus, in general, when a mobile terminal powers up in a visited network, the visited network pulls the subscriber policy for the mobile terminal from the mobile terminals home network. The mobile terminal subscriber policy may be pulled from the home network, for example, during an authentication procedure. Preferably based on the roaming agreement between the visited network and the home network operators, the visited network local policy, and the subscriber policy (derived from the home network), the visited network operator may configure a user policy for the mobile terminal.

The user policy is delivered to the mobile terminal so that the mobile terminal can properly treat and mark uplink packets. The user policy may be piggy-backed in an authentication message, and the user policy may be enforced when the mobile terminal has been successfully authenticated. In an alternative, the user policy may be delivered to the mobile terminal in a new, specific message.

Advantageously, the invention enables local networks to enforce local policies in the mobile terminal, even when the mobile terminal is associated with a different network. The user policy satisfies a roaming agreement between the home and visited network operators, and the visited network local policy. The delivery of a user policy to the mobile terminal allows the mobile terminal to properly treat and mark each uplink in the visited network. It also synchronises the policy in the mobile terminal and the visited network. The preferable piggy-backing of the user policy in an authentication procedure means that the invention can be implemented without a requirement for additional signalling.

The embodiments of the invention described herein have been presented in the context of determining a user policy for a terminal connected in a visited network. The invention is not, however, limited in its applicability to the determination of a user policy in a visited network. For example, in an alternative, a new user policy may be determined and provided to a terminal in different circumstances. For example, an equipment failure may force the determination and communication of a new user policy for a subscriber connected in its home network. It is also envisaged that the invention may be utilised in an emergency situation, where the priority of a group of subscribers is set. This may include, for example, a broadcast to place all subscribers at the lowest priority setting and only a certain group of users are given the higher priority.

The invention has been described herein by way of reference to a particular, non-limiting example. The scope of protection afforded by the invention is defined by the appended claims.

The invention claimed is:

1. A method for providing a user policy to a terminal connected in a network, the method comprising:
receiving, in a visited network, a first user policy associated with the terminal, wherein the first user policy is applied in a home network of the terminal;
configuring a second user policy for the terminal based at least in part on the received first user policy and based at least in part on a local policy of the visited network; and
providing the configured second user policy to the terminal.

2. The method according to claim 1 wherein the method further comprises registering the terminal in the visited network.

3. The method according to claim 2, wherein the terminal is registered through a protocol for carrying authentication for network access procedure.

4. The method according to claim 1 wherein configuring the second user policy comprises identifying an attribute which is common to the first user policy and the local policy; and
determining a value for the attribute which satisfies the local policy.

5. The method according to claim 1 wherein the first user policy comprises a subscriber profile of the terminal.

6. The method according to claim 1, wherein configuring the second user policy for the terminal is further based at least in part on a roaming agreement between the visited network and the home network.

7. The method according to claim 1 further comprising applying the second user policy to uplink packets which are sent from the terminal.

8. The method according to claim 1, further comprising detecting the terminal in the visited network.

9. The method according to claim 1, further comprising pulling the first user policy from the home network.

10. The method according to claim 1, wherein the first user policy is obtained during an authentication of the terminal.

11. The method according to claim 1 wherein the second user policy is provided to the terminal during an authentication of the terminal.

12. The method according to claim 11 wherein the second user policy is piggy-backed in an authentication message to the terminal.

13. The method according to claim 1 further comprising enforcing the second user policy responsive to a successful authentication.

14. The method according to claim 1 further comprising authenticating the terminal through an authentication and key agreement scheme.

15. The method according to claim 1 wherein the second user policy is configured and provided to the terminal responsive to a determined emergency.

16. The method according to claim 1 wherein the configured second user policy is enforced by the visited network.

17. A mobile communication system including:
a terminal having a home network; and
a network element located in a visited network and configured to
receive a first user policy associated with the terminal, wherein the first user policy is applied in the home network of the terminal;
create a second user policy for the terminal based at least in part on the received first user policy and based at least in part on a local policy of the visited network; and
provide the created second user policy to the terminal.

18. The system according to claim 17 wherein the network element is further configured to control registration of the terminal in the visited network.

19. The system according to claim 17 wherein creating the second user policy comprises:
identifying a common attribute between the first user policy and the local policy; and
determining a value for the common attribute which satisfies the local policy.

20. The system according to claim 17 wherein the first user policy comprises a subscriber profile of the terminal.

21. The system according to claim 17, wherein creating the second user profile for the terminal is further based at least in part on a roaming agreement between the visited network and the home network of the terminal.

22. The system according to claim 17 wherein the terminal is configured to apply the second user profile to uplink packets transmitted from the terminal.

23. The system according to claim 17 wherein the second user policy is enforced by the visited network.

24. A user terminal for connection in a mobile communication system, the user terminal being configured to:
authenticate into a visited network, wherein the visited network is distinct from a home network of the user terminal;
receive an authentication success message from the visited network, wherein the authentication success message includes a user policy which is to be used by the user terminal in the visited network, and further wherein the user policy is based at least in part on a local policy of the visited network; and
apply the user policy to uplink packets which are transmitted from the user terminal.

25. The user terminal according to claim 24 wherein the user policy is received from a network element of the visited network.

26. The user terminal according to claim 24 wherein the user policy overrides a home network policy of the user terminal.

27. The user terminal according to claim 24 wherein the user policy is enforced by the visited network.

28. A network element in a mobile communication system, the network element being configured to:
receive an authentication request from a user terminal;
communicate with a home network of the user terminal to determine whether to grant the authentication request;
receive a first user policy of the user terminal from the home network; create second user policy for the user terminal based at least in part on the first user policy and at least in part on a local policy of the visited network; and
if the authentication request is to be granted, provide the second user policy to the user terminal for use within the visited network.

29. The network element according claim 28 wherein the network element is an element of the visited network.

30. The network element according to claim 28 wherein the network element is further configured to register the user terminal in the visited network.

31. The network element according to claim 28 wherein creating the second user policy comprises identifying a common attribute between the first user policy and the local policy; and
determining a value for the common attribute which satisfies the local policy.

32. The network element according to claim 28, wherein creating the second user policy is further based at least in part on a roaming agreement between the visited network and the home network of the user terminal.

33. The network element according to claim 28, wherein the network element is further configured to detect the user terminal in the visited network.

34. The network element according to claim 28, wherein the first user policy comprises a subscriber policy of the user terminal, and further wherein the network element is configured to pull the subscriber policy from the home network.

35. The network element according to claim 28, wherein the first user policy is received from the home network during authentication of the user terminal.

36. The network element according to claim 28, wherein the second user policy is provided to the user terminal along with an authentication message.

* * * * *